3,816,464
PROCESS FOR PREPARING FURANONES
Dietrich Erdmann, Klemens Schuhrer, Wolfgang Koch, and Gerhart Schneider, Darmstadt, Germany, assignors to Merck Patent Gesellschaft mit beschrankter Haftung, Darmstadt, Germany
No Drawing. Filed Mar. 8, 1972, Ser. No. 232,974
Claims priority, application Germany, Apr. 3, 1971, P 21 16 416.9; Feb. 1, 1972, P 22 04 520.1
Int. Cl. C07d 5/06
U.S. Cl. 260—343.6                  2 Claims

ABSTRACT OF THE DISCLOSURE

The invention relates to furanones of the general formula

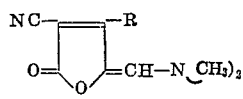

wherein R is phenyl substituted by phenyl, halogen, trifluoromethyl, alkyl and/or alkoxy containing up to 4 carbon atoms, or thienyl optionally substituted by chlorine, which are valuable effective agents for pest control exhibiting very good algicidal and herbicidal properties, as well as fungicidal and antibacterial activity. The invention further relates to intermediates for the preparation of said furanones, and to an improvement in the process for the production thereof.

BACKGROUND OF THE INVENTION

Field of the invention

This invention relates to furanones and to methods of preparing and using them. More particularly, this invention relates to furanone compounds which exhibit pesticidal activity, to methods of and intermediates in preparing such compounds, and to methods of pest control using such compounds as effective algicidal, herbicidal, antibacterial and fungicidal agents.

Description of the prior art

Furanone compounds of the formula

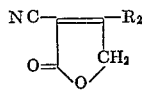

wherein $R_2$ is phenyl or 4-bromophenyl are known intermediates for the preparation of dyestuffs, as taught by Ford et al., Journal of Organic Chemistry, Volume 32 (1967), pages 173–177. From this publication, it is also known that 3-cyano-4-phenyl-2(5H)-furanone can be converted to 3-cyano-5-dimethylaminomethylene-4-phenyl-2 (5H)-furanone, which has been described in the copending application filed on Dec. 15, 1970, Ser. No. 98,442, to exhibit herbicidal and algicidal properties.

SUMMARY OF THE INVENTION

It has not been known before that there are derivatives of 3 - cyano-5-dimethylaminomethylene-4-phenyl-2(5H)-furanone which exhibit pesticidal properties which are far superior to those of that known active compound.

Accordingly, it is an object of this invention to provide novel furanone compounds having valuable pesticidal activity.

Another object of this invention is to provide methods of combatting algae, undesired plants, fungi and bacteriae.

An additional object of this invention is to provide novel intermediates for the preparation of the furanones according to the invention, and an improved process for the production of those and structurally related intermediates.

Briefly, these and other objects, features and advantages of the present invention are attained in one aspect thereof by providing furanones of the general formula I

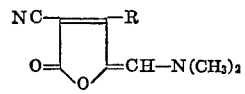

wherein R is phenyl substituted by phenyl, halogen of an atomic number up to 53, trifluoromethyl, alkyl of up to 4 carbon atoms and/or alkoxy of up to 4 carbon atoms, or is thienyl or thienyl substituted by chlorine. These compounds are valuable effective agents for pest control which exhibit very good algicidal and selective herbicidal properties, as well as fungicidal and antibacterial activity.

In another aspect, the objects of the present invention are attained by providing compounds of the general formula II

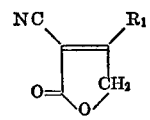

wherein $R_1$ is phenyl substituted by phenyl, halogen of an atomic number up to 17, trifluoromethyl, alkyl of up to 4 carbon atoms and/or alkoxy of up to 4 carbon atoms, or is thienyl or thienyl substituted by chlorine. These compounds are novel intermediates in the preparation of the above pesticidally active compounds.

In yet another aspect, the objects of the present invention are attained by providing an improved process for the preparation of the above and structurally related intermediates of the general formula III

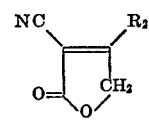

wherein $R_2$ is selected from the group consisting of phenyl, phenyl substituted by phenyl, halogen of atomic number up to 53, trifluoromethyl, alkyl of up to 4 carbon atoms and/or alkoxy of up to 4 carbon atoms, thienyl, and thienyl substituted by chlorine, which comprises reacting the α-acetoxy ketone $R_2$—CO—$CH_2$—$OCOCH_3$ with a cyanoacetate.

DETAILED DESCRIPTION AND PREFERRED EMBODIMENTS

In the furanones of general formula I, R represents thienyl, chlorothienyl, in particular 5-chlorothienyl-(2)- and 4-chlorothienyl-(3), and, preferably, substituted phenyl radicals. As a general principle, all of the hydrogen atoms in the phenyl radicals may be substituted by one or more of the above-mentioned groups. Usually, however, no substituted phenyl radical R of formula I, as well as $R_1$ and $R_2$ in formulae II and III, respectively, carries more than 4 substituents. Preferred furanones of formulae I or II are those wherein R, or $R_1$, respectively, represent mono- or disubstituted phenyl radicals. Among the monosubstituted phenyl radicals, those substituted in the 3- or 4-position are most preferred. Examples of furanones of the present invention wherein R, or $R_1$, respectively, is a monosubstituted phenyl radical, include but are not limited to the following compounds:

3-cyano-4-(3-fluorophenyl)-2(5H)-furanone,
3-cyano-5-dimethylaminomethylene-4-(3-fluorophenyl)-2 (5H)-furanone,
3-cyano-4-(4-fluorophenyl)-2(5H)-furanone, 3-cyano-5-dimethylaminomethylene-4-(4-fluorophenyl)-2(5H)-furanone,
3-cyano-4-(3-biphenylyl)-2(5H)-furanone,
3-cyano-5-dimethylaminomethylene-4-(3-biphenylyl)-2(5H)-furanone,
3-cyano-4-(4-biphenylyl)-2(5H)-furanone,
3-cyano-5-dimethylaminomethylen-4-(4-biphenylyl)-2(5H)-furanone,
3-cyano-4-(3-trifluoromethylphenyl)-2(5H)-furanone,
3-cyano-5-dimethylaminomethylene-4-(3-trifluoromethylphenyl)-2(5H)-furanone,
3-cyano-4-(4-trifluoromethylphenyl)-2(5H)-furanone,
3-cyano-5-dimethylaminomethylene-4-(4-trifluoromethylphenyl)-2(5H)-furanone,
3-cyano-4-(4-iodophenyl)-2(5H)-furanone,
3-cyano-5-dimethylaminomethylene-4-(4-iodophenyl)-2(5H)-furanone,
3-cyano-4-(3-ethylphenyl)-2(5H)-furanone,
3-cyano-5-dimethylaminomethylene-4-(3-ethylphenyl)-2(5H)-furanone,
3-cyano-4-(4-n-butylphenyl)-2(5H)-furanone,
3-cyano-5-dimethylaminomethylene-4-(4-n-butylphenyl)-2(5H)-furanone,
3-cyano-4-(3-n-propoxyphenyl)-2(5H)-furanone,
3-cyano-5-dimethylaminomethylene-4-(3-n-propoxyphenyl)-2(5H)-furanone,
3-cyano-4-(2-chlorophenyl)-2(5H)-furanone,
3-cyano-5-dimethylaminomethylene-4-(2-chlorophenyl)-2-(5H)-furanone,
3-cyano-4-(2-methylphenyl)-2(5H)-furanone,
3-cyano-5-dimethylaminomethylene-4-(2-methylphenyl)-2(5H)-furanone.

If in the furanones of formulae I and II, R and $R_1$, respectively, represent disubstituted phenyl radicals, the substituents may be located in the 2,3- 2,4-, 2,5-, 2,6-, 3,4- or 3,5-positions of the phenyl nuclei. Preferred disubstituted phenyl radicals are those which are substituted in the 2,5-, 3,4- and 3,5-positions. In the disubstituted phenyl radicals, as well as in the tri- and tetrasubstituted ones, the substituents may be identical or different. If two substituents are located in adjacent positions of a phenyl nucleus, e.g. in the 2,3- or 3,4-positions, these substituents must not be too bulky, i.e. not both of them must be branched alkyl, alkoxy and/or phenyl groups. Preferably, no di-, tri- and tetrasubstituted phenyl radical substituting the 4-position of a furanone according to the invention carries more than one phenyl group as substituent. Specific examples of furanones of the present invention wherein R or $R_1$, respectively, is a disubstituted phenyl radical, include but are not limited to the following:

3-cyano-4-(2,3-dimethylphenyl)-2(5H)-furanone,
3-cyano-5-(dimethylaminomethylene-4-(2,3-dimethylphenyl)-2(5H)-furanone,
3-cyano-4-(2,4-dichlorophenyl)-2(5H)-furanone,
3-cyano-5-dimethylaminomethylene-4-(2,4-dichlorophenyl)2-(5H)-furanone,
3-cyano-4-(3-methyl-4-methoxyphenyl)-2(5H)-furanone,
3-cyano-5-dimethylaminomethylene-4-(3-methyl-4-methoxyphenyl)-2(5H)-furanone,
3-cyano-4-(2-methyl-4-isopropylphenyl)-2(5H)-furanone,
3-cyano-5-dimethylaminomethylene-4-(2-methyl-4-isopropylphenyl)-2(5H)-furanone,
3-cyano-4-(3-chloro-4-methylphenyl)-2(5H)-furanone,
3-cyano-5-dimethylaminomethylene-4-(3-chloro-4-methylphenyl)-2(5H)-furanone,
3-cyano-4-(2-fluoro-4-methoxyphenyl)-2(5H)-furanone,
3-cyano-5-dimethylaminomethylene-4-(2-fluoro-4-methoxyphenyl)-2(5H)-furanone,
3-cyano-4-(3-bromo-4-chlorophenyl)-2(5H)-furanone,
3-cyano-5-dimethylaminomethylene-4-(3-bromo-4-chlorophenyl)-2(5H)-furanone,
3-cyano-4-(3-trifluoromethyl-4-fluorophenyl)-2(5H)-furanone,
3-cyano-5-dimethylaminomethylene-4-(3-trifluoromethyl-4-fluorophenyl)-2(5H)-furanone,
3-cyano-4-(3,4-diethoxyphenyl)-2(5H)-furanone,
3-cyano-5-dimethylaminomethylene-4-(3,4-diethoxyphenyl)-2(5H)-furanone,
3-cyano-4-(3-ethoxy-5-isobutylphenyl)-2(5H)-furanone,
3-cyanno-5-dimethylaminomethylene-4-(3-ethoxy-5-isobutylphenyl)-2(5H)-furanone.

Examples of furanones according to the invention wherein R, or $R_1$, respectively, is a tri- or tetrasubstituted phenyl radical include but are not limited to the following compounds:

3-cyano-4-(2,4,5-trichlorophenyl)-2(5H)-furanone,
3-cyano-5-dimethylaminomethylene-4-(3,4,5-trichlorophenyl)-2(5H)-furanone,
3-cyano-4-(2,4,6-trimethylphenyl)-2(5H)-furanone,
3-cyano-5-dimethylaminomethylene-4-(3,4,5-trimethoxyphenyl)-2(5H)-furanone,
3-cyano-4-(2,3,5,6-tetramethylphenyl)-2(5H)-furanone.

From the above cited publication of Ford et al., it is known to prepare 3-cyano-4-phenyl-2(5H)-furanone, as well as the 4-(4-bromophenyl)-derivative by reacting an α-halo ketone with an alkali metal cyano acetate. On principle, also the novel furanones of formula II can be prepared by this reaction. The yield of the desired compounds prepared by this way, however, is about 30 to 40% of theory only, which is too low to allow an economic production of pesticides based on these compounds on a technical scale.

Surprisingly, it has now been discovered that the furanones of the general formula III, which includes the novel intermediates of formula II as well as those known from the Ford et al. publication, can be produced with drastically improved yields if an α-acetoxy ketone instead of the α-halo ketone of Ford et al., is reacted with a cyanoacetate, preferably with an alkyl cyanoacetate in the presence of a base. By this improved process, the furanones of formula III are produced with yields of 60–100% of theory. This is particularly surprising in view of the reaction mechanism postulated by Ford et al. According to that mechanism, the initial step in this furanone synthesis is the formation of an α-oxoalkyl ester by a nucleophilic displacement of the halogen in the α-halo ketone by the cyanoacetate anion. As a general principle, in such nucleophilic displacement reactions, halogens are far better leaving groups than the acetoxy group, because hydrohalic acids are stronger than acetic acid, of J. D. Roberts and M. C. Caserio, Basic Principles of Organic Chemistry, W. A. Benjamin, Inc., New York and Amsterdam, 3rd printing 1965, page 301). Thus, everybody skilled in the art would have expected that in the reaction under consideration, the replacement of halogen by acetoxy would exhibit a negative effect with respect to the reaction rate and yield. Surprisingly, just the opposite effect was observed in the reaction according to the invention.

The α-acetoxy ketones employed in the improved process according to the invention have the general formula IV

wherein $R_2$ has the meaning given in formula III above. Some of these α-acetoxy ketones are known, and those unknown until now can be prepared analogously to the known ones, e.g. by reacting the corresponding α-halo ketones with sodium acetate in a mixture of acetic acid and acetic anhydride. Under these conditions, the α-halo ketones are converted into the α-acetoxy ketones almost completely. It has been discovered that generally it is not necessary to isolate the α-acetoxy ketones thus prepared from the reaction mixtures. Excellent yields of the furanones of formula III are also obtained if the crude acetoxylation mixture, from which the excess solvent mixture has been distilled off, is reacted with the cyanoacetate directly.

It is preferred, according to the invention, to react the α-acetoxy ketones of formula IV with lower alkyl cyanoacetates, wherein the alkyl moiety contains up to 4 carbon atoms, in particular with methyl, ethyl, or isobutyl cyanoacetate. Ethyl cyanoacetate is particularly preferred because of its easy availability in technical scale.

Usually, the reaction of the α-acetoxy ketone with the cyanoacetate is carried out in solution. Polar solvents, for example lower aliphatic alcohols like methyl, ethyl, isopropyl or butyl alcohol which optionally may contain up to 10 percent of water, as well as dimethyl formamide or dimethyl sulfoxide, are preferred. In carrying out the reaction it has proven advantageous to dissolve nearly equimolar amounts of the α-acetoxy ketone and the cyanoacetate in an excess of the solvent chosen, said excess being from 1.5 to 30 times of the weight of the reactants, preferably from 2 to 15 times thereof. To that solution or even suspension, a solution or suspension of a nearly equimolar amount of a base is added with stirring and cooling. Suitable bases include but are not limited to alkali metal or earth alkali metal hydroxides and lower alcoholates such as sodium hydroxide, potassium hydroxide, calcium hydroxide, barium hydroxide, sodium methoxide, potassium methoxide, sodium ethoxide, potassium ethoxide and calcium methoxide. Preferably, the base is dissolved or suspended in the same solvent as the reactants, e.g. if the reactants are dissolved in ethyl alcohol, it is preferred to add the base as a solution or suspension in ethyl alcohol, too. During the addition of the base, the reaction temperature should be kept between about $-10°$ C. and $+50°$ C., preferably between $0°$ C. and $+40°$ C. After the addition of the base, the reaction mixture usually is stirred for some additional time at room temperature. Thereafter, the reaction mixture is acidified, preferably by addition of a mineral acid such as hydrochloric or sulfuric acid, until a pH between 1 and 6 is reached. From that acidified mixture, the furanone of Formula II precipitates in a very pure form which can be collected in the usual manner, e.g. by filtration or centrifugation.

The furanones of Formula III are converted into the 5-dimethylaminomethylene furanones of Formula I and into the known herbicidal agent 3-cyan-5-dimethylaminomethylene-4-phenyl-2(5H)-furanone, respectively, by reacting them with dimethyl formamide in the presence of a chlorinating agent. Suitable chlorinating agents include but are not limited to inorganic and organic acid chlorides, f.e. phosphorus pentachloride, phosphorus trichloride, phosphorus oxychloride, thionyl chloride, sulfuryl chloride, phosgene, acetyl chloride and bezoyl chloride. Among these, phosphorus oxychloride and phosgene are particularly preferred. Preferably, dimethyl formamide and the chlorination agent are used in at least the same molar amounts as the furanone. If desired, the introduction reaction of the dimethylaminomethylene group can be carried out in a solvent which is inert with respect to the reactants. Suitable solvents include ethers, e.g. diethyl ether, dioxane and tetrahydrofuran; hydrocarbons, e.g. petroleum ether, benzene, toluene and xylene; chlorinated hydrocarbons, e.g. chloroform, carbon tetrachloride, methylene chloride, and chlorobenzene. It is preferred, however, to carry out this reaction in an excess of dimethyl formamide. The reaction temperature is kept between $10°$ C. and $100°$ C., preferably between $30°$ C. and $80°$ C. Depending on the amounts of the reactants used, the reaction is finished after from 5 minutes to 20 hours.

Usually, the 5-dimethylaminomethylene furanones of Formula I are precipitated in crystalline form during the reaction, and can be isolated by filtration or centrifugation. In other cases, isolation is carried out by distilling the volatile reactants off, preferably under reduced pressure, or by pouring the reaction mixture into a large excess of water, whereby the desired compounds are precipitated. The average yield of the conversion reaction ranges from 80 to 100% of theory. Nearly all of the 5-dimethylaminomethylene furanones of Formula I are yellowish, yellowish green, greenish of bluish green compounds which can be purified by recrystallisation from polar solvents or solvent mixtures.

The furanones of formula I are valuable effective agents for pest control. In particular, they exhibit a very good algicidal effect and selective herbicidal properties. Furthermore, they exhibit satisfactory fungicidal and antibacterial properties. The superior effectiveness of the compounds of the present invention was confirmed by the following experiments.

Test for Algicidal Effect 20 ml. of a sterilized nutrient solution prepared by dissolving 1.0 g. of calcium nitrate, 0.25 g. of magnesium sulfate heptahydrate, 0.25 g. of potassium dihydrogen phosphate, 0.25 g. of potassium nitrate, and 20 mg. of iron sulfate in 3 liters of water, was mixed, in an Erlenmeyer flask, with 0.2 ml. of acetonic solution of the active agent of this invention (dilution series) and thereafter inoculated with a slurry of about $10^6$ cells of Chlorella pyrenoidosa in 1 ml. of water. Subsequently, the flasks were shaken for 7 days at $22°$ C. and under daylight and access of air on a vibrating table at 80 motions per minute. Thereafter, the number of algae cells were determined by counting. In Table 1 below, the concentrations of the active agents tested are set forth (in p.p.m.=parts per million) which effectively inhibit the reproduction of the algae. Substances compared included copper sulfate pentahydrate, a commercial algicide containing as the active agent a mixture of urea and 30% of ethyl dimethyl benzylammonium chloride (Dimanin® A, produced by Farbenfabriken Bayer), triphenyltin acetate, and 3-cyano-5-dimethylaminomethylene-4-phenyl-2(5H)-furanone.

TABLE 1.—*Chlorella pyrenoidosa* test

| Effective agent | Minimum inhibitory concentration with respect to Chlorella (in p.p.m.) |
|---|---|
| (a) Known compounds: | |
| Copper sulfate pentahydrate | 5 |
| Dimanin® A | 5 |
| Triphenyltin acetate | 3 |
| 3-cyano-5-dimethylaminomethylene-4-phenyl-2(5H)-furanone | 2 |
| (b) Furanones of the invention: | |
| 3-cyano-5-dimethylaminomethylene-4-(4-fluorophenyl)-2(5H)-furanone | 1.0 |
| 3-cyano-5-dimethylaminomethylene-4-(4-chlorophenyl)-1(5H)-furanone | 0.5 |
| 3-cyano-5-dimethylaminomethylene-4-(4-bromophenyl)-2(5H)-furanone | 1.0 |
| 3-cyano-5-dimethylaminomethylene-4-(4-methoxyphenyl)-2(5H)-furanone | 1.0 |
| 3-cyano-5-dimethylaminomethylene-4-(4-methylphenyl)-2(5H)-furanone | 0.2 |
| 3-cyano-5-dimethylaminomethylene-4-(4-ethylphenyl)-2(5H)-furanone | 0.5 |
| 3-cyano-5-dimethylaminomethylene-4-(3,4-dichlorophenyl)-2(5H)-furanone | 0.05 |
| 3-cyano-5-dimethylaminomethylene-4-(3,4-dimethylphenyl)-2(5H)-furanone | 0.05 |
| 3-cyano-5-dimethylaminomethylene-4-(3-methyl-5-tert.butylphenyl)-2(5H)-furanone | 0.02 |
| 3-cyano-5-dimethylaminomethylene-4-(3-biphenylyl)-2(5H)-furanone | 0.005 |
| 3-cyano-5-dimethylaminomethylene-4-[5-chlorothienyl-(2)]-2(5H)-furanone | 0.2 |

This table clearly demonstrates that the active compounds of this invention are effective at substantially lower concentrations than the known algicidally effective agents examined herein. Similar results were obtained also with algae cultures of *Ankistrodesmus braunii, Euglena gracilis, Ochromonas danica, Scenedesmus obliquus* and *Stichococcus bacillaris*.

Another advantage provided by the furanones according to the present invention in algae control is their surprisingly low toxicity for animals, in particular for fishes. While copper sulfate is toxic for fishes at a concentration of 7% of its algicidally effective concentration, the compound according to the invention, 3-cyano - 5 - dimethylaminomethylene - 4 - (3-biphenylyl)-2(5H)-furanone, is toxic for fishes at a concentration which is about 1,000% of its algicidally effective concentration. Optimal amounts of the furanones of formula I of this invention for the control of algae will vary according to the particular compound being used, the algae species being treated, the method of application, and environmental factors. Suitable dosages for given applications, f.e. in lakes, ponds, drains, swimming pools, paddle ponds, aquaria as well as in flooded cultures like rice cultures, in greenhouses, flower-pots, in docks, in dressing plants for industrial water and in sewage-treatment plants, as well as in underwater paints for ships or sluice-works, can readily be determined according to the above or other standard methods for measuring algicidal activity. Rates of application suitable to effect algicidal activity preferably range from 0.05 to 5 mg. of effective agent per cubic meter of water to be treated, and more preferably from 0.1 to 3 mg. per cubic meter. Underwater paints usually contain from 0.5 to 15 percent by weight of effective agent, preferably from 1 to 10 percent.

The selective herbicidal properties of the furanones of formula I of this invention are demonstrated by the pre-germination test on Raphanus sativus (radish), Cucumis sativus (cucumber), Avena fatua (wild oats) and Echinochloa crus-galli (water grass). In conducting these tests, 10 seeds of each of the test plants were sown in compost-filled paper cups having a surface area of 50 cm.$^2$ and each convered with 1 cm. of sand. On the next day, 25 ml. of an aqueous dilution of variously concentrated preparations of the effective compounds to be tested were poured thereon, respectively. Due to the high amount of water (25 ml./50 cm.$^2$ corresponding to 50,000 l./hectare), the effective agent was flushed into the soil. After 3–5 weeks, the growth and condition of the young plants were evaluated, and the minimum amount or concentration of effective agent at which the test plants are destroyed with certainty is determined. It was observed that grassy weeds were severely damaged by the furanones according to the invention while the vegetables tested were far less affected thereby. Due to this selectivity the compounds according to the invention can be used advantageously in such cases where herbicides with a wide range of effectivity are less suitable.

Optimal herbicidally effective amounts of the furanones of formula I of this invention will vary according to the particular furanone compounds being used, the plant species being treated, the method of application, and environmental factors. Suitable sosages for a given application can readily be determined by the pre-germination test or other standard methods for measuring herbicidal activity. Application rates suitable for effecting herbicidal activity preferably range from 0.1 to 30 kg./hectare, and more preferably from 0.5 to 15 kg. of effective agent per hectare being treated.

The fungicidal effectiveness of the furanone effective agents of this invention was proven by spore germination tests on the fungus Venturia inaequalis. In conducting this test, 2 drops (about 0.03 ml.) of variously concentrated acetone solutions of effective agent are uniformly distributed in the indentations (having an area of about 2.25 cm.$^2$) of concave-ground object slides. After the solvent has evaporated, 2 drops of a suspension containing 25,000–50,000 spores of the test fungus per ml. are overlaid on the coatings of effective agent, and the slides are incubated for 24 hours in a moist chamber at 22° C. Thereafter, the germinated spores are counted under a microscope. From the percentages of the non-germinated spores at various concentrations of effective agent, $LD_{50}$ and $LD_{95}$ values are graphically determined. Fungicidal effectiveness of the thioureas according to this invention against strains of Plasmopara viticola, Alternaria spec., Botrytis cinerea, Sphaerotheca fuliginea, and Cladosporium fulvum was also established in the same manner.

Optimal fungicidally effective amounts of the furanones of this invention will vary according to the particular furanone compound being used, the fungus species being treated, the method of application, and environmental factors. Suitable dosages for a given application can readily be determined by the spore germination test or by other standard methods for measuring fungicidal activity. Application rates suitable for effecting fungicidal activity preferably range from 0.1 to 10.0 kg. of effective agent per hectare being treated, and more preferably from 1.0 to 5.0 kg.

The antibacterial effect can be determined by the tube dilution test and the agar dilution test in accordance with standard methods. In this connection, the minimum inhibitory concentrations are determined with respect to a strain of Bacillus subtilis. In the agar dilution test, the test substances are added to the agar medium inoculated with the test germs in staggered concentrations. Incubating takes place at 37° C. and inhibition determination is conducted after 24 hours. In the tube dilution test, incubation is likewise carried out at 37° C., but inhibition determination is made after 18 hours.

The antibacterial activity of the furanones according to the invention is a very valuable completion of the algicidal properties of these compounds. Particularly in swimming pools, paddle ponds and aquaria, it is very advantageous to have an effective agent which combats algae and bacteriae at the same time.

The effective agents of this invention can be processed together with all of the usual additives and carrier substances customary for formulating pest control agents. For example, they can be prepared as solutions or emulsion concentrates which can also be sprayed as aerosols, or as suspensions, dispersions, powders, pastes, jellies, and granulated formulations.

The amount of effective agent in the above preparations is ordinarily at least 0.1 and less than 95% by weight, preferably at least 0.5 and less than 90% by weight. Granulated substances will contain, in most cases, between 1 and 20% by weight of effective agent, whereas solutions, emulsion concentrates, suspensions, and sprayable powders contain 5–95% by weight, preferably 20–90% by weight, of effective agent. The furanones of formula I can, of course, also be utilized in combination with other effective agents.

Compositions employing the agents of this invention may be formulated in a conventional manner, for example by mixing with solvents or solid carrier substances, optionally with the use of surfactants as wetting and emulsifying agents. Especially suitable solvents include liquid hydrocarbons, e.g., petroleum ether, cyclohexane, benzene, xylene, solvent naphtha (aromatic hydrocarbon mixtures with boiling points of between 150 and 180° C.), petroleum, especially petroleum fractions having boiling points of between 80 and 200° C., tetrahydronaphthalene and decahydronaphthalene; aliphatic alcohols, e.g., methanol, ethanol, isopropanol, isobutanol, n-butanol, or hexanol; glycol ethers, e.g., methyl glycol and ethyl glycol; ketones, e.g., acetone, methyl ethyl ketone, diethyl ketone, methyl isobutyl ketone, isophorone, cyclohexanone and methylcyclohexanone; dioxane; dimethylformamide; N-methylpyrrolidone; dimethyl sulfoxide; acetonitrile; or mixtures of the above.

Emulsion concentrates can also be commercially prepared for subsequent dilution, e.g., with water, prior to use. When one or more of the effective agents is water-soluble, it is, of course, possible to use water as the solvent or diluent in preparing the concentrate.

Conventional pulverulent solid carrier substances and fillers include, for example; bole, kaolin, siliceous chalk (naturally occurring mineral, consisting of kaolinite and quartz), bentonite, ground shale, pyrophyllite, talc, montmorillonite, chalk, dolomite, mica, silicic acid, aluminum silicate or calcium silicate, kieselguhr, or ground walnut hulls. As wetting agents and emulsifiers, anionic, cationic or nonionic surface-active substances may be used, depending on the purpose for which the preparations are to be used. Suitable wetting agents and emulsifiers include soaps, e.g., sodium laurate; alkyl sulfates or sulfonates, e.g., sodium dodecyl sulfate or sulfonate; sulfonated and sulfated ethers; sulfonated alkyl fatty acid esters; sulfonated glycol fatty acid esters; quaternary ammonium salts, e.g., trimethylammonium iodide; amines and amides with a long aliphatic chain; monoethers of polyglycols with long-chain aliphatic alcohols, e.g., the reaction products of ethylene oxide or polyethylene glycol with higher aliphatic alcohols; monoesters of polyglycols with fatty acids, e.g., oleic acid; monoethers of polyglycols with alkylated phenols; partially esterified polyhydric alcohols, e.g., sorbitan trioleate; partially or completely esterified polyglycol ethers of polyhydric alcohols, e.g., the stearic acid triester of the polyglycol ether of sorbitan.

The furanone pest control agents of this invention also can be formulated with binders and dispersing agents, such as cellulose and the derivatives thereof, e.g., methyl-, ethyl-, hydroxypropyl-, or carboxymethylcellulose; tragacanth; pectins; gum arabic; sulfite waste liquor powder; or lignin.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1

(a) 67.5 g. of anhydrous aluminium chloride are introduced into an ice-cooled solution of 56.5 g. of chloroacetyl chloride in 500 ml. of o-xylene at such a rate that the temperature of the reaction mixture does not exceed 20–30°. After the end of the evolution of hydrogen chloride, the mixture is stirred for one hour at room temperature and is then poured into 1.5 l. of ice water. The organic phase is separated, washed 3 times with 150 ml. of water each, and is dried over sodium sulfate. After evaporation of the excess of o-xylene, α-chloro-3,4-dimethyl-acetophenone remains as a crystalline material, which, after recrystallization from acetonitrile, melts at 70°.

Analogously, the following compounds are prepared (liquid products by fractionated distillation of the water-washed and dried organic phase):

α-chloro-4-methyl-acetophenone, M.P. 52°;
α-chloro-4-ethyl-acetophenone, B.P.$_{12}$: 156–158°;
α-chloro-4-isopropyl-acetophenone, B.P.$_{12}$: 159–162°;
α-chloro-3-methyl-5-tert.butyl-acetophenone,
α-chloro-2,4-dimethyl-acetophenone, M.P. 60°;
α-chloro-2,5-dimethyl-acetophenone, B.P.$_{12}$: 143–145°;
α-chloro-2,4,6-trimethyl-acetophenone, M.P. 68°;
α-chloro-2,3,5,6-tetramethyl-acetophenone, M.P. 63°;
α-chloro-4-fluoro-acetophenone, M.P. 47°;
α-chloro-4-bromo-acetophenone, M.P. 119°;
α-chloro-4-iodo-acetophenone;
4,α-dichloro-acetophenone, M.P. 99°;
3,4,α-trichloro-acetophenone, M.P. 43°;
2,4,5,α-tetrachloro-acetophenone, B.P.$_{12}$: 173–175°;
α-chloro-4-methoxy-acetophenone, M.P. 92°;
α-chloro-3,4-dimethoxy-acetophenone, M.P. 96°;
α-chloro-4-phenyl-acetophenone, M.P. 129°;
5-chloro-2-(2-chloroacetyl)-thiophene, M.P. 83°.

(b) 58.5 g. of α-chloro-3,4-dimethyl-acetophenone and 32.5 g. of anhydrous sodium acetate are boiled under reflux for 6 hours in a mixture of 80 ml. glacial acetic acid and 12 ml. of acetic anhydride. Subsequently, the solvent is distilled off under reduced pressure, and the residue is taken up in 300 ml. of methanol. To the resulting suspension, 37.5 g. of ethyl cyanoacetate are added. The mixture is cooled with ice water to 0–5°, and a solution of 16 g. of sodium hydroxide in 300 ml. of methanol which is cooled to 5°, is added all at once. The reaction mixture is then stirred for 5 hours, and is poured into 2 l. of ice water. Thereafter, the resulting solution is acidified with 20% hydrochloric acid, and the precipitated 3-cyano-4-(3,4-dimethylphenyl)-2(5H)-furanone is filtered off with suction. After washing with water and methanol, the product melts at 192°. The yield is 52 g. (74% of theory).

In an analogous manner, there are obtained the following compounds in yields of 60 to 85% of theory:

3-cyano-4-phenyl-2(5H)-furanone, M.P. 166°;
3-cyano-4-(4-chlorophenyl)-2-(5H)-furanone; M.P. 233°;
3-cyano-4-(4-bromophenyl)-2(5H)-furanone, M.P. 206°;
3-cyano-4-(4-fluorophenyl)-2(5H)-furanone, M.P. 206°;
3-cyano-4-(4-iodophenyl)-2(5H)-furanone;
3-cyano-4-(3-trifluoromethyl-phenyl)-2(5H)-furanone;
3-cyano-4-(4-methoxyphenyl)-2-(5H)-furanone, M.P. 185°;
3-cyano-4-(4-ethoxyphenyl)-2(5H)-furanone;
3-cyano-4-(4-methylphenyl)-2(5H)-furanonce, M.P. 160°;
3-cyano-4-(3-methylphenyl)-2-(5H)-furanone;
3-cyano-4-(4-ethylphenyl)-2-(5H)-furanone, M.P. 132°;
3-cyano-4-(4-isopropylphenyl)-2(5H)-furanone, M.P. 95°;
3-cyano-4-(2,4-dimethylphenyl)-2(5H)-furanone, M.P. 121°;
3-cyano-4-(2,5-dimethylphenyl)-2(5H)-furanone, M.P. 121°;
3-cyano-4-(2,4,6-trimethylphenyl)-2(5H)-furanone;
3-cyano-4-(2,3,5,6-tetramethylphenyl)-2(5H)-furanone;
3-cyano-4-(3-methyl-5-tert.butylphenyl)-2(5H)-furanone, M.P. 98°;
3-cyano-4-(3,4-dimethoxyphenyl)-2(5H)-furanone, M.P. 221°;
3-cyano-4-(3,4-dichlorophenyl)-2(5H)-furanone, M.P. 189°;
3-cyano-4-(2,4,5-trichlorophenyl)-2(5H)-furanone;
3-cyano-4-(3-biphenylyl)-2(5H)-furanone, M.P. 142°;
3-cyano-4-(4-biphenylyl)-2(5H)-furanone, M.P. 249°;
3-cyano-4-(3-thienyl)-2(5H)-furanone;
3-cyano-4-[5-chlorothienyl)-(2)]-2(5H)-furanone, M.P. 175°.

(c) 52 g. of 3-cyano-4-(3,4-dimethylphenyl)-2(5H)-furanone are added to a mixture of 22.5 ml. of phosphorus oxychloride and 250 ml. of dimethyl formamide. The reaction mixture is stirred for 2 hours and subsequently poured into 1 l. of ice water. The precipitated 3-cyano-5-dimethylaminomethylene - 4 - (3,4 - dimethylphenyl)-2(5H)-furanone is collected by filtration; after washing with water and methanol, the product melts at 253°. The yield is 60 g. (91% of theory).

Analogously, the following compounds are prepared:

3-Cyano-5-dimethylaminomethylene-4-(4-methylphenyl)-2(5H)-furanone, M.P. 228°;
3-Cyano-5-dimethylaminomethylene-4-(3-methylphenyl)-2(5H)-furanone;
3-Cyano-5-dimethylaminomethylene-4-(4-ethylphenyl)-2(5H)-furanone, M.P. 175°;
3-Cyano-5-dimethylaminomethylene-4-(4-isopropylphenyl)-2-(5H)-furanone, M.P. 186°;
3-Cyano-5-dimethylaminomethylene-4-(3-methyl-5-tert.butylphenyl)-2(5H)-furanone, M.P. 217°;
3-Cyano-5-dimethylaminomethylene-4-(2,4-dimethylphenyl)-2(5H)-furanone, M.P. 240°;
3-Cyano-5-dimethylaminomethylene-4-(2,5-dimethylphenyl)-2(5H)-furanone, M.P. 194°;
3-Cyano-5-dimethylaminomethylene-4-(2,4,6-trimethylphenyl)-2(5H)-furanone;
3-cyano-5-dimethylaminomethylene-4-(2,3,5,6-tetramethylphenyl)-2(5H)-furanone;
3-cyano-5-dimethylaminomethylene-4-(4-fluorophenyl)-2(5H)-furanone, M.P. 242°;
3-cyano-5-dimethylaminomethylene-4-(4-chlorophenyl)-2(5H)-furanone, M.P. 266°;

3-cyano-5-dimethylaminomethylene-4-(4-bromophenyl)-2(5H)-furanone, M.P. 263°;
3-cyano-5-dimethylaminomethylene-4-(4-iodophenyl)-2-(5H)-furanone;
3-cyano-5-dimethylaminomethylene-4-(3-trifluoromethylphenyl)-2(5H)-furanone;
3-cyano-5-dimethylaminomethylene-4-(3,4-dichlorophenyl)-2(5H)-furanone, M.P. 242°;
3-cyano-5-dimethylaminomethylene-4-(2,4,5-trichlorophenyl)-2(5H)-furanone;
3-cyano-5-dimethylaminomethylene-4-(4-methoxyphenyl)-2(5H)-furanone, M.P. 203°;
3-cyano-5-dimethylaminomethylene-4-(4-ethoxyphenyl)-2(5H)-furanone;
3-cyano-5-dimethylaminomethylene-4-(3,4-dimethoxyphenyl)-2(5H)-furanone, M.P. 271°;
3-cyano-5-dimethylaminomethylene-4-(3-biphenylyl)-2-(5H)-furanone, M.P. 223°;
3-cyano-5-dimethylaminomethylene-4-(4-biphenylyl)-2-(5H)-furanone, M.P. 227°;
3-cyano-5-dimethylaminomethylene-4-(3-thienyl)-2(5H)-furanone;
3-cyano-5-dimethylaminomethylene-4-[5-chlorothienyl-(2)]-2(5H)-furanone, M.P. 225°.

EXAMPLE 2

A solution of 89 g. of α-acetoxy-acetophenone and 70.5 g. of butyl cyanoacetate in 400 ml. of methanol is mixed, while cooling with ice water, all at once with a solution of 22 g. of sodium hydroxide in 300 ml. of methanol, which is also cooled. After leaving the reaction mixture to stand for 4 hours at ambient temperature, 20% hydrochloric acid is added until a pH value of 5 is reached. The creamcoloured material which thereby precipitates out is filtered off with suction, washed with water, ethanol and diethyl ether and then dried in a vacuum at 90°. There are obtained 77 g. (83.3% of theory) of 3-cyano-4-phenyl-2(5H)-furanone, which is thin layer chromatographically uniform and melts at 164°.

EXAMPLE 3

To 37.5 g. of α-acetoxy-3,4-dimethoxy-acetophenone and 17 g. of ethyl cyanoacetate in 150 ml. of methanol, a solution of 8.4 g. of potassium hydroxide in 75 ml. of methanol is added at 0°. The reaction mixture is left to stand for 2 hours at ambient temperature. Subsequently, it is diluted with 250 ml. of water and acidified with concentrated hydrochloric acid. The 3-cyano-4-(3,4-dimethoxyphenyl)-2(5H)-furanone which precipitates out is filtered off with suction and recrystallised from acetonitrile. It has a melting point of 221° and the yield is 30 g. (81.5% of theory).

EXAMPLE 4

A cooled solution of sodium methylate, prepared from 1.8 g. of sodium and 30 ml. of methanol, is added at 0° to a solution of 16 g. of 4-chloro-α-acetoxy-acetophenone and 8.5 g. of ethyl cyanoacetate in 75 ml. of methanol, the temperature thereby increasing to about 38°. After standing for 2 hours, the precipitated grey-green product is filtered off with suction, dissolved in water and mixed with 3 ml. of concentrated hydrochloric acid. The 3-cyano-4-(4-chlorophenyl)-2(5H)-furanone which thereby precipitates out is filtered off with suction and recrystallised from acetonitrile. It has a melting point of 233° and the yield is 12 g. (73% of theory).

EXAMPLE 5

Into a suspension of 12.7 g. of 3-cyano-4-(3,4-dichlorophenyl)-2(5H)-furanone in 25 ml. of dimethyl formamide, 5 g. of phosgene are introduced with vigorous stirring. Subsequently, the mixture is stirred for another hour, and is cooled to 0°. The thus obtained crystalline, very pure 3-cyano-5-dimethylaminomethylene - 4 - (3,4-dichlorophenyl)-(5H)-furanone is collected by filtration; the yield is 13.9 g. (90% of theory), with a melting point of 240–241°.

EXAMPLE 6

Sprayable Powder

25% 3-Cyano-5-dimethylaminomethylene-4-(4-methylphenyl)-2(5H)-furanone
1% Sodium dialkyl naphthalenesulfonate
12% Silicic acid
15% Sulfite waste liquor powder
47% Bole

EXAMPLE 7

Dispersion

40% 3-Cyano-5-dimethylaminomethylene-4-(3,4-dimethylphenyl)-2(5H)-furanone
1% Carboxymethylcellulose
2% Alkylphenol polyglycol ether
1% Bentonite
56% Water

EXAMPLE 8

Granulated Composition

12% 3-Cyano-5-dimethylaminomethylene-4-(4-fluorophenyl)-2(5H)-furanone
81% Bentonite
2% Sodium alkylbenzenesulfonate
5% Sulfite waste liquor powder

EXAMPLE 9

Algae Inhibiting Underwater Paint

25% Epoxy resin prepared from 2,2-bis-(4-hydroxyphenyl)-propane and 1-chloro-2-ethanol (Epicote® 1001 produced by Shell Oil Co.)
20% High viscous tar ($T_v$ 49/51 according to German Industrial Standards No. 1995)
12.5% Toluene
12.5% 1-Butanol
15% Barite
5% Ferrous mica
5% 3 - Cyano-5-dimethylaminomethylene-4-(3-methyl-5-tert.butylphenyl)-2(5H)-furanone
4.5% Asbestine
0.5% Silicic acid.

Prior to painting, 100 parts by weight of the lacquer consisting of the above ingredients are mixed with 30 parts of a mixture consisting of 50 parts of a liquid polyamino polyamide (Versamid® 125 produced by General Mills, Chemical Div., Kanakee, Ill.), 25 parts 1-Butanol and 25 parts of toluene.

EXAMPLE 10

Emulsion Concentrate

15% 3 - Cyano-5-dimethylaminomethylene-4-(3-biphenylyl)-2(5H)-furanone
80% Acetone
5% Nonylphenol polyglycol ether

EXAMPLE 11

Emulsion Concentrate

20% 3 - Cyano - 5 - dimethylaminomethylene-4-(4-ethylphenyl)-2(5H)-furanone
60% Acetone
17% Acetonitrile
3% Emulsifier mixture (calcium dodecylbenzenesulfonate and polyoxyethylene sorbitan esters of a mixture of fatty acids and rosin acids)

EXAMPLE 12

Sprayable Powder

55% 3 - Cyano-5-dimethylaminomethylene-4-(4-chlorophenyl)-2(5H)-furanone

35% Calcium silicate
8% Oleic acid N-methyltauride
2% Sodium dialkyl naphthalenesulfonate.

EXAMPLE 13

Emulsion Concentrate

20% 3 - Cyano-5-dimethylaminomethylene-4-[5-chlorothienyl-(2)]-2(5H)-furanone
60% Acetone
28% Isopropyl alcohol
2% Nonylphenol polyglycol ether

EXAMPLE 14

Sprayable Powder

15% 3 - Cyano - 5 - dimethylaminomethylene-4-(2,5-dimethylphenyl)-2(5H)-furanone
30% Sodium trichloroacetate
1% Sodium alkyl benzenesulfonate
3% Lignin
10% Precipitated aluminium silicate
41% Siliceous chalk

What is claimed is:

1. In the process of preparing a furanone of the general formula

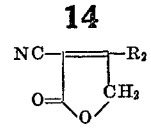

wherein $R_2$ is selected from the group consisting of phenyl, phenyl substituted by phenyl, halogen of an atomic number up to 53, trifluoromethyl, alkyl of up to 4 carbon atoms and/or alkoxy of up to 4 carbon atoms, by reacting an α-substituted ketone with a cyanoacetate the improvement comprising employing an α-acetoxy ketone $$R_2-CO-CH_2-OCOCH_3$$

as said α-substituted ketone.

2. In the process according to claim 1 the further improvement comprising employing a lower alkyl cyanoacetate as said cyanoacetate.

References Cited

UNITED STATES PATENTS 3,468,912  9/1969  Ford et al. -------- 260—343.6

DONALD G. DAUS, Primary Examiner

A. M. T. TIGHE, Assistant Examiner

U.S. Cl. X.R.

424—279; 71—67, 88; 260—332.2 R, 488 CD